United States Patent [19]

Cooperstein

[11] Patent Number: 5,203,762
[45] Date of Patent: Apr. 20, 1993

[54] VARIABLE FREQUENCY CENTRIFUGE CONTROL

[75] Inventor: Joseph L. Cooperstein, Philadelphia, Pa.

[73] Assignee: Alfa-Laval Separation, Inc., Warminster, Pa.

[21] Appl. No.: 630,655

[22] Filed: Dec. 20, 1990

[51] Int. Cl.$^5$ .............................................. B04B 9/10
[52] U.S. Cl. ............................................ 494/7; 494/53; 494/84; 318/68; 318/376
[58] Field of Search .................. 494/7, 53, 54, 55, 82, 494/83, 84; 318/39, 41, 42, 43, 44, 51, 68, 77, 376; 363/37, 65

[56] References Cited

U.S. PATENT DOCUMENTS

| | | |
|---|---|---|
| 2,867,378 | 1/1959 | Harlow . |
| 3,333,177 | 7/1967 | Sutton ...................................... 321/2 |
| 3,439,242 | 4/1969 | Gasser ...................................... 318/66 |
| 3,440,507 | 4/1969 | Derrick et al. ........................ 318/152 |
| 3,753,071 | 8/1973 | Engel et al. .............................. 321/2 |
| 3,857,070 | 12/1974 | Smith ................................. 317/18 R |
| 4,009,431 | 2/1977 | Johnson ................................. 318/34 |
| 4,024,451 | 5/1977 | Nishino et al. ........................ 321/2 |
| 4,070,290 | 1/1978 | Crosby ................................. 210/91 |
| 4,080,553 | 3/1978 | Lyman ................................. 318/136 |
| 4,099,107 | 7/1978 | Eder ..................................... 318/227 |
| 4,129,249 | 12/1978 | Todd . |
| 4,141,488 | 2/1979 | Gense . |
| 4,292,531 | 9/1981 | Williamson ........................... 290/14 |
| 4,298,162 | 11/1981 | Hohne . |
| 4,303,192 | 12/1981 | Katsume . |
| 4,315,305 | 2/1982 | Siemon ................................. 363/37 |
| 4,327,862 | 5/1982 | Jakobs . |
| 4,334,647 | 6/1982 | Taylor . |
| 4,369,915 | 1/1983 | Oberg et al. ............................ 494/8 |
| 4,400,767 | 8/1983 | Fenter .................................. 363/21 |
| 4,411,646 | 10/1983 | Cyphelly ............................... 494/53 |
| 4,474,309 | 10/1984 | Solomon ................................. 222/1 |
| 4,521,840 | 6/1985 | Hoadley ............................... 363/35 |
| 4,620,296 | 10/1986 | Siemon ................................. 363/51 |
| 4,642,745 | 2/1987 | Steigerwald et al. ................ 363/37 |
| 4,697,136 | 9/1987 | Ishikawa ............................. 323/267 |
| 4,704,879 | 11/1987 | Christ et al. ........................ 68/140 |
| 4,720,776 | 1/1988 | Guyeska ................................ 363/37 |
| 4,751,398 | 6/1988 | Ertz, III ............................. 307/66 |
| 4,751,629 | 6/1988 | Shimizu et al. ...................... 363/37 |
| 4,805,134 | 2/1989 | Recker et al. ........................ 363/98 |
| 4,807,102 | 2/1989 | Serras-Paulet ........................ 363/37 |
| 4,849,950 | 7/1989 | Sugiura et al. ...................... 363/48 |
| 4,876,460 | 10/1989 | Johnson ................................. 307/64 |
| 4,884,182 | 11/1989 | Ando et al. ........................... 363/37 |
| 4,978,331 | 12/1990 | Luchetta ............................... 494/53 |
| 5,073,848 | 12/1991 | Steigerwald .......................... 363/65 |

FOREIGN PATENT DOCUMENTS

| | | |
|---|---|---|
| 0124738 | 1/1984 | European Pat. Off. . |
| 0469944A2 | 2/1992 | European Pat. Off. . |
| 3641569 | 4/1988 | Fed. Rep. of Germany . |
| 2508813 | 1/1983 | France . |

OTHER PUBLICATIONS

Communication and European Search Report for EP application No. 91311849.3.

Primary Examiner—Philip R. Coe
Assistant Examiner—Randall E. Chin
Attorney, Agent, or Firm—Seidel, Gonda, Lavorgna & Monaco

[57] ABSTRACT

A decanter centrifuge includes a control system for receiving input AC power and outputting a variable voltage and frequency for controlling the speed of the backdrive and the main drive motor. The control system includes a first controller for converting AC power into DC power and then converting the DC power to AC power at a variable voltage and frequency to the main drive motor. A second controller is connected to the first conversion unit through a common DC bus. The second controller converts DC power to AC power and supplies AC power at a variable frequency to the backdrive motor. The braking force created by the backdrive motor during operation of the decanter centrifuge creates electricity which is passed through the second controller and through the common DC bus to the first controller. Thus, the generated power from the backdrive motor is converted into power for use by the main drive motor. A regeneration package may also be provided in order to supply the generated power from the backdrive to the AC input line during decelerating the conveyor when the bowl is simultaneously being decelerated and the main drive motor is also generating power.

9 Claims, 1 Drawing Sheet

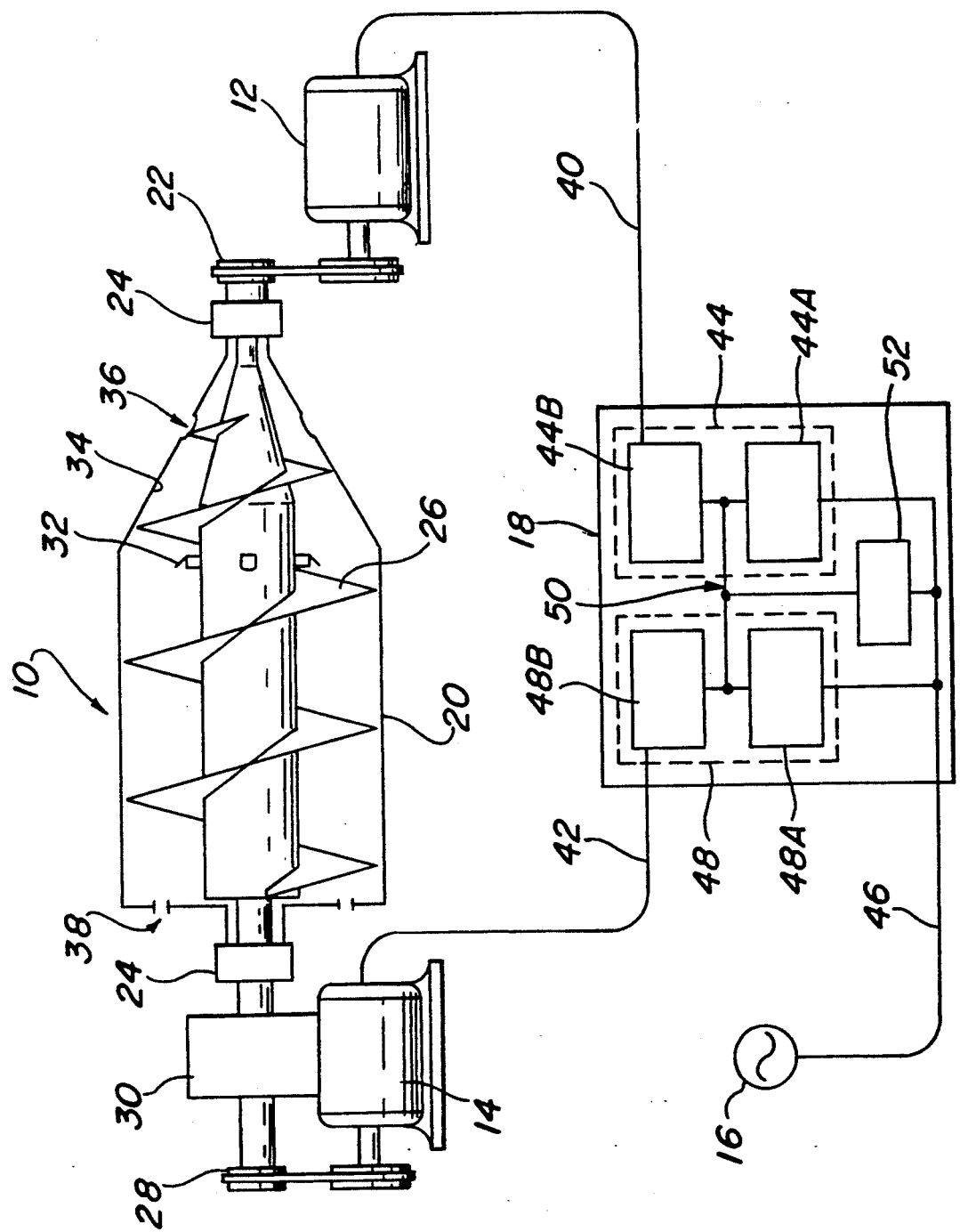

VARIABLE FREQUENCY CENTRIFUGE CONTROL

FIELD OF THE INVENTION

The present invention relates to centrifuges and preferably to a decanter type centrifuge. In particular, the present invention relates to a drive controller for a decanter centrifuge which regenerates power from the back drive motor and supplies same to the main drive motor.

BACKGROUND OF THE INVENTION

A decanter type centrifuge generally includes a rotatable bowl having a coaxially mounted screw conveyer therein. The bowl is rotated at a constant but variable speed in order to create a centrifugal force to separate a fluid feed mixture into its constituent parts. The heavier portion of the feed, typically called solids because of its, at least partially, conveyable nature, collects on the inner surface of the bowl due to centrifugal force. The screw conveyor is rotated at a relative speed with respect to the bowl. This differential rotation creates a differential action between the flights of the screw and the bowl wall resulting in the conveyance of the solids along the bowl wall. This differential speed can be varied during the operation of the centrifuge depending on certain parameters and the desired output qualities of the separated constituent parts of the feed mixture. The light or liquid portion of the feed moves radially inward of the heavier solids as a result of the centrifugal force. Thereafter, the separated heavy and light materials are separately discharged, typically from opposite ends of the bowl.

There are many structures and methods for creating a differential speed between the bowl and the conveyor of a decanter centrifuge. One type structure includes two electric motors. The first or main drive motor rotates the bowl. The second or backdrive motor rotates the conveyor at a second speed through a gear box. Because of the torques and friction created in rotating a liquid and solids filled bowl, the conveyor will want to rotate at the speed of the bowl. During operation, the backdrive motor usually acts as a brake, receiving torque from the conveyor. The backdrive motor (acting as a brake) maintains constant controlled speed, thus maintaining a constant differential speed between the bowl and the conveyor. During braking, the backdrive motor generates electrical power. Power is also generated by the backdrive motor when the speed of the conveyor is decreased. Furthermore, a decrease in speed of operation of either the backdrive and the main drive motors can result in the generation of power from either or both motors.

It is advantageous that motors utilized for a decanter centrifuge are variable in speed. Thus, the speed of rotation of the bowl and the conveyor may be controlled independently while operating. Both AC and DC type motors may be utilized as the main drive motor and/or the backdrive motor. However, DC type motors are generally more costly. Also, in certain applications, DC motors are not easily applicable. This is particularly true in hazardous situations where an explosion proof operation is required, due to the constant sparking that is involved within a DC motor operation. Within these explosion proof type operations there are certain levels of hazard. Division One, normally hazardous, requires an explosion proof AC or DC motor. Division Two explosion proof operation is classified as not normally hazardous. In this Division Two situation two faults would be required in order for an explosion to occur. A non-explosion proof AC motor or an explosion proof DC motor is typically required in this Division Two type situation.

The regeneration of power is often available within a centrifuge. Typically, a DC motor can be utilized to regenerate power when braking and to return that power back into the AC input line. However, DC motors are substantially more expensive than AC motors. Moreover, in explosion proof operations, the DC motor cost differential is further increased. In Division One/normally hazardous, an explosion proof AC motor would be cheaper than the DC explosion proof motors by a factor of 5. In Division Two (not normally hazardous), non-explosion proof AC motors are usually acceptable for proper operation.

Further advantages in reliability and ease of maintenance are obtained by using AC type motors. DC motors use commutators and brushes which wear and must be replaced often, especially in the corrosive environment usually seen by decanters. AC motors are simpler and use less parts.

Although power regeneration was possible for feeding back into the original AC power line, one problem that was not addressed was the regeneration of power directly from the backdrive motor into the main drive motor. Also, with the usual regenerative variable frequency control, the AC regenerated wave form distorts the normal form of the AC supply.

BRIEF DESCRIPTION OF THE INVENTION

The present invention relates to a drive control system for the drive motors of a centrifuge and in particular a decanter centrifuge. The drive control system of the present invention includes a full variable frequency (V/F) drive controller which is connected to an AC power source at the input end and at the opposite end to the main drive motor of the decanter centrifuge. The full V/F controller converts AC power from the input line to DC power. The DC power is then converted back into AC power at the required voltage and frequency. Both are variably controlled in order to adjust the rotational speed of the main drive motor. The backdrive motor is connected to a V/F controller which converts the DC power to AC power at the desired voltage and frequency, both being variable for proper operation. The V/F controller of the backdrive is connected to the full V/F controller of the main drive through a common DC bus. The common DC bus permits the power generated by the backdrive motor to be supplied to the second half of the full V/F controller of the main drive motor and to reduce the overall draw of power from the input AC line by the main drive motor.

An additional feature contemplated by the present invention is a regeneration package which directs the generated power of backdrive and drive motors back into the AC line when the main drive motor is also generating power. This condition exists when the centrifuge bowl is being decelerated either to a slower operational speed or during stopping of the operation.

The advantages of the present invention relate particularly to the reduction in overall cost of the operation of the decanter centrifuge by use of regenerated power and also by the ability to regenerate power while utilizing AC type drive motors. Also, the other advantages, described previously, are created.

BRIEF DESCRIPTION OF THE DRAWING

For the purpose of illustrating the invention, there is shown in the drawings a form which is presently preferred; it being understood, however, that this invention is not limited to the precise arrangements and instrumentalities shown.

FIG. 1 illustrates a decanter centrifuge including a drive control system as contemplated by the present invention.

DETAILED DESCRIPTION OF THE DRAWING

In FIG. 1 there is shown a decanter centrifuge 10 having a main drive motor 12 and a backdrive motor 14. The main drive motor 12 and backdrive motor 14 are electrically connected to an AC power source 16 through a drive control system 18. The main drive motor 12 is adapted to drive the bowl 20 of the decanter centrifuge 10 via drive pulley 22. The bowl 20 is mounted for rotation about its longitudinal axis and is supported on opposite ends by bearings 24. The conveyor portion 26 of the decanter centrifuge 10 drives or is driven by the backdrive motor 14. The conveyor 26 drives or is driven by drive pulley 28 and through gear box 30. As illustrated, the centrifuge 10 is of the horizontal type. Decanters may also be mounted vertically. Furthermore, other variations in the structure of the centrifuge are contemplated without departing from the scope of the present invention.

The main drive motor 12 is adapted to rotate the bowl 20 at a constant but variable rotational speed. The rotation of the bowl 20 about its axis creates a centrifugal force on the fluid input through feed nozzles 32. The feed liquid upon entering the bowl 20 is arranged in an annular ring around the central longitudinal axis of the bowl 20 due to the centrifugal force. The centrifugal force causes a separation of the constituent parts of the liquid according to density. In a decanter centrifuge the constituent parts typically involve a lighter liquid material and a heavier solids type material which is, at least partially, conveyable.

The backdrive motor 14 rotates or is rotated by the conveyor at a second rotational speed which is slightly different, typically less, than that of the bowl 20. This differential speed of the conveyor 26 with respect to the bowl 20 causes the conveyor flights to move the separated solids material, located relatively outwardly with respect to the separated liquid and with respect to the bowl's longitudinal axis, along the inside bowl wall. The solids are conveyed towards the tapered end of the bowl, up the beach 34 and discharged through the discharge outlets 36. The separated liquid portion of the feed material is discharged through outlets 38 positioned at the opposite end of the bowl 20 from the solids discharge outlets 36. In this regard, the operation of the decanter centrifuge illustrated in FIG. 1 is typical of known decanter centrifuges, although other liquid flow techniques are known.

The control system 18 as contemplated by the present invention is utilized to supply power to the backdrive motor 14 and the main drive motor at a variable frequency and a desired voltage. The input AC power from source 16 is supplied to a complete or full V/F controller 44 through line 46. The V/F controller 44 includes a first part 44A which converts input AC power from the AC power source 16 to DC power.

V/F controller 44 also includes a second part 44B which converts DC power to AC power at a variable frequency and voltage. The power from the control system 18 is then supplied to the main drive motor 12 through line 40. Another V/F controller 48 is also provided within the control system 18. As illustrated, V/F controller 48 includes a first part 48A and second part 48B identical to V/F controller 44. V/F controller 48 draws power from source 16 through line 46 and controls the operation of backdrive motor 14 through line 42. Controllers 44 and 48 are electrically connected at a common DC bus 50. As an alternative to the structure shown, part 48A of the V/F controller 48 may be eliminate. In this alternate embodiment, the second part 48B of V/F controller 48 draws DC power from the full V/F controller 44 through the common DC bus 50. Controller 48 then converts the DC input power to variable frequency AC for controlling the operation of backdrive motor 14 through line 42.

During operation of the decanter centrifuge 10, the relative rotational speed of the conveyor 26 with respect to the bowl 20 is constantly changing in accordance with various conditions and operation parameters. Because of friction by the fluid and solids within the rotating bowl and operational torques, the conveyor 26 will want to rotate on its own as a result of the bowl rotation. Thus, the backdrive motor 14 is required during usual operational conditions to create a braking torque in order to maintain a constant differential speed or to adjust that differential speed. The braking torque is created by the backdrive motor 14 which creates electrical energy. This electrical energy (which is variable frequency AC) is fed through line 42 back into the control system 18. In accordance with the present invention, the V/F controller 48 converts the generated variable frequency AC power from the backdrive motor 14 into DC power and then regenerates the DC power through the common DC bus 50 to supply same to the second half of the full V/F controller 44. The power from the backdrive motor 14 is then utilized by the main drive motor 12. This regenerative power usage from the backdrive motor 14 assists in driving the main drive motor 12 and results in a substantial reduction in the overall draw of electrical power from the AC power source 16 through line 46. Moreover, because the power is being used within control system 18, imperfect wave forms should not be introduced into the plant power supply from backdrive regeneration.

As illustrated in FIG. 1, the control system 18 may also include a regeneration package 52. The regeneration package 52 is used to return power from the backdrive motor 14 to the AC power line 16 when the main drive motor 12 is also generating power by braking. This condition occurs when the speed of the conveyor 26 and the bowl 20 are being reduced to adjust the overall operation of the centrifuge or during the deceleration of the bowl 20 and the conveyor 26 in order to discontinue operation of the centrifuge 10. The regeneration package 52 is utilized only when power is being generated by the main drive motor 12 through full V/F controller 44. Thus, any input of incomplete wave forms due to regeneration into the plant system should be limited to times only when stopping or decelerating the centrifuge rotation.

The present invention contemplates that the backdrive motor 14 is of substantially reduced power capability as compared to the power capabilities of the main drive motor 12. As an example, in the P850 or P660 type decanter centrifuge as manufactured by Alfa-Laval Separation, Inc. of Warminster, Pa, the assignee of the present invention, a 7.5 horse power main drive AC motor is utilized while a 1 horse power backdrive motor is typically utilized. These motors are typically found in the art, such as those manufactured by Magnetek Co.'s Drive and Systems Division of New Berlin, Wis., or any similar manufacturer. This differential in power requirements is the reason why the power for the backdrive motor 14 can be drawn through the DC bus 50 when necessary rather than requiring a separate AC/DC portion 48A. Larger decanters also have this power capability relationship and are applicable to the present invention.

As for the control system 18 as contemplated by the present invention a number of suppliers are available, including ASEA-Brown Boveri which sells through its Industrial Systems Inc. Standard Drives Division also of New Berlin, WI, a system known as the Parajust Model GX type AC variable frequency drive system. Other manufacturers of control systems as contemplated by the present invention include Reliance Electric Corp. of Euclid, Ohio, which sells through its V.S. Drives Marketing Division a Model GP2000, and Magnetek Co. which sells a unit under the designation GBD502. Each of the systems may or may not include part 48A of V/F controller 48, depending on availability.

The regeneration package 52 as contemplated for use with the present invention may be similar to that sold by Bonitron, Inc. of Nashville, Tenn. This regeneration package would likely be applicable to the control systems noted above as manufactured by ASEA-Brown Boveri and Magnetek. However, it is contemplated that the model GP2000 as sold by Reliance includes a regeneration package built to the overall system. It is also contemplated that a control system could be constructed whereby the regeneration package 52 and AC/DC controller portion 48A are eliminated while the function thereof is completed through the primary AC/DC controller portion 44A which is the systems only connection to the plant power supply.

The advantages of the present invention generally relate to the utilization of regenerated power to operate the main drive motor of the decanter centrifuge. This use of regeneration power within the decanter centrifuge system is distinguished from systems where the backdrive motor regenerates power back into the AC input line directly. This contemplated system is applicable for both AC and DC type motors. In this type operation the V/F controllers 44 and 48 would not require a separate DC to AC power conversion. However, the advantages are obtained by the use of AC type motors due to cost reduction, particularly in the situations where explosion proof operation is required. Other advantages have been described and are contemplated.

The present invention may be embodied in other specific forms without departing from the spirit or essential attributes thereof and, accordingly, reference should be made to the appended claims, rather than to the foregoing specification, as indicating the scope of the invention.

I claim:

1. A controller for a decanter centrifuge of the type having a solid imperforate bowl rotatable about its longitudinal axis, a conveyor coaxially arranged for rotation therein at a relative differential speed, a main drive motor for rotating the bowl, and a back drive motor for rotating the conveyor at a differential speed with respect to the bowl, the centrifuge controller comprising: (a) means for receiving AC power from a source, (b) first controller means for converting the converted DC power into AC power at a variable voltage and frequency and for controlling the output frequency to the main drive motor, (c) second controller means for converting DC power to AC power at a variable voltage and frequency and for controlling the output frequency to the back drive motor, and (d) a common DC bus connecting the first controller means to the second controller means, the second controller means converting power generated by the back drive motor during operation of the centrifuge from AC to DC, and the DC bus supplying the DC power to the DC to AC power conversion portion of the first controller means for supply to the main drive motor.

2. A controller for a decanter centrifuge as claimed in claim 1 further comprising means for regeneration of DC power for feeding the AC power source during deceleration of the bowl and the conveyor of the decanter centrifuge and during the creation of power through the main drive motor and the back drive motor.

3. A controller for a decanter centrifuge as claimed in claim 1 wherein the second controller means further comprises a first portion for converting AC power from the source into DC power and wherein the common DC bus is connected to the second controller between the first portion and the portion for converting DC power into AC power.

4. A controller for a centrifuge including two drive motors comprising: (a) means for receiving an AC power source, (b) first controller means for converting the input AC power for supply to one centrifuge motor at a variable voltage and frequency, (c) second controller means for converting power from the first controller means for supply to the second motor at a variable voltage and frequency, and (d) a common bus connecting the first controller means to the second controller means, the second controller means capable of converting power generated from the second centrifuge motor during operation of the centrifuge for input to the first controller means for use by the first centrifuge motor.

5. A controller for a centrifuge as claimed in claim 4 wherein the first controller means converts AC power from the source into DC power and then converts the DC power into AC power at a variable voltage and frequency, and wherein the second controller means converts DC power delivered through the first controller means into AC power at the variable voltage and frequency for the second centrifuge motor.

6. A controller for a centrifuge as claimed in claim 5 wherein the second controller means also includes a portion for converting AC power from the source to DC power.

7. A controller for a centrifuge as claimed in claim 6 further comprising means for regeneration of DC power for feeding to the AC power source during deceleration of the centrifuge and during the creation of power through the first centrifuge motor and the second centrifuge motor.

8. A controller for a centrifuge as claimed in claim 5 further comprising means for controlling the operation of the centrifuge by varying the frequency output of the first and second controller means.

9. A decanter centrifuge having a solid and imperforate bowl mounted for rotation about its longitudinal axis, the bowl having a cylindrical portion and a tapered portion at one end, a conveyor coaxially arranged for rotation within the bowl, an AC type variable frequency main drive motor for rotating the bowl, an AC type variable frequency back drive motor for rotating the conveyor portion of the centrifuge, and a differential gear box for controlling the relative rotational speed of the conveyor with respect to the bowl, the improvement comprising: means for receiving an AC power source at a constant frequency and voltage and converting the input AC power to multiple AC power output at a variable voltage and frequency, the receiving means comprising (i) means for receiving AC power from a source, (ii) first controller means for converting AC power from the source into DC power and then for converting the converted DC power into AC power at a variable voltage and frequency, (iii) means for controlling the output frequency of the first controller means to the main drive motor for adjusting the rotational speed of the main drive motor, (iv) second controller means for converting DC power into AC power at a variable voltage and frequency, (v) means for controlling the output frequency of the second controller means for adjusting the rotational speed of the back drive motor, (vi) a common DC bus means connecting the first controller means to the second controller means, the second controller means capable of converting power generated by the back drive motor during operation of the centrifuge to DC power, the DC bus applying the DC power to the DC to AC power conversion portion of the first controller means for supply to the main drive motor, and (vii) means for regeneration of DC power from the back drive motor to the AC power source during the simultaneous deceleration of the bowl and the conveyor by the main drive motor and the back drive motor, respectively, during operation of the centrifuge.

* * * * *